United States Patent [19]

Duback

[11] Patent Number: 4,836,142
[45] Date of Patent: Jun. 6, 1989

[54] AQUARIUM AND WATERFALL SYSTEM

[76] Inventor: Clyde L. Duback, 112 N.W. 68th St., Vancouver, Wash. 98665

[21] Appl. No.: 939,414

[22] Filed: Dec. 8, 1986

[51] Int. Cl.⁴ ............................................. A01K 63/00
[52] U.S. Cl. ......................................... 119/5; 239/23; D30/101
[58] Field of Search ................. 119/4, 2, 3, 5; 239/12, 239/16, 17, 20, 23; D30/101, 105, 106, 107

[56] References Cited

U.S. PATENT DOCUMENTS

| | | | |
|---|---|---|---|
| 78,952 | 5/1868 | Furman | 119/3 |
| 1,564,903 | 12/1925 | Shephard | 119/3 |
| 3,122,126 | 2/1964 | Yamada | 119/3 |
| 3,212,713 | 10/1965 | Chatten | 239/17 |
| 3,717,123 | 2/1973 | Regnier | 119/3 |
| 4,111,363 | 9/1978 | Kawamura et al. | 239/17 X |
| 4,349,293 | 9/1982 | Rosenberger | 239/17 X |

FOREIGN PATENT DOCUMENTS

| | | | |
|---|---|---|---|
| 86168 | 8/1983 | European Pat. Off. | 119/3 |
| 1047454 | 10/1983 | U.S.S.R. | 119/3 |

*Primary Examiner*—Gene Mancene
*Assistant Examiner*—R. Thomas Price
*Attorney, Agent, or Firm*—Kolisch, Hartwell & Dickinson

[57] ABSTRACT

An aquarium system having a plurality of aquarium tanks which employs waterfalls between the tanks to enhance the display of marine life. Each one of the aquarium tanks is adapted to contain marine life up to a different predetermined upper water level. The water is directed to form waterfalls which carry it from aquarium tanks having higher upper water levels into aquarium tanks having lower upper water levels. A transfer system pumps water from the tank having the lowest upper water level to the tank having the highest upper water level thereby providing a constant flow of water for the waterfalls.

4 Claims, 3 Drawing Sheets

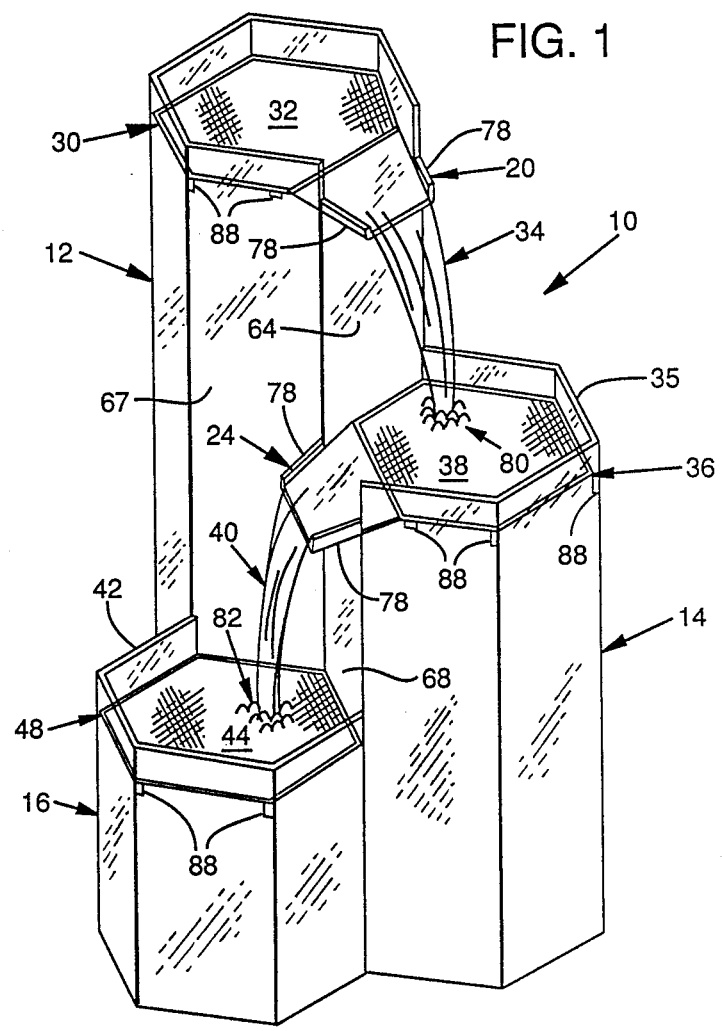

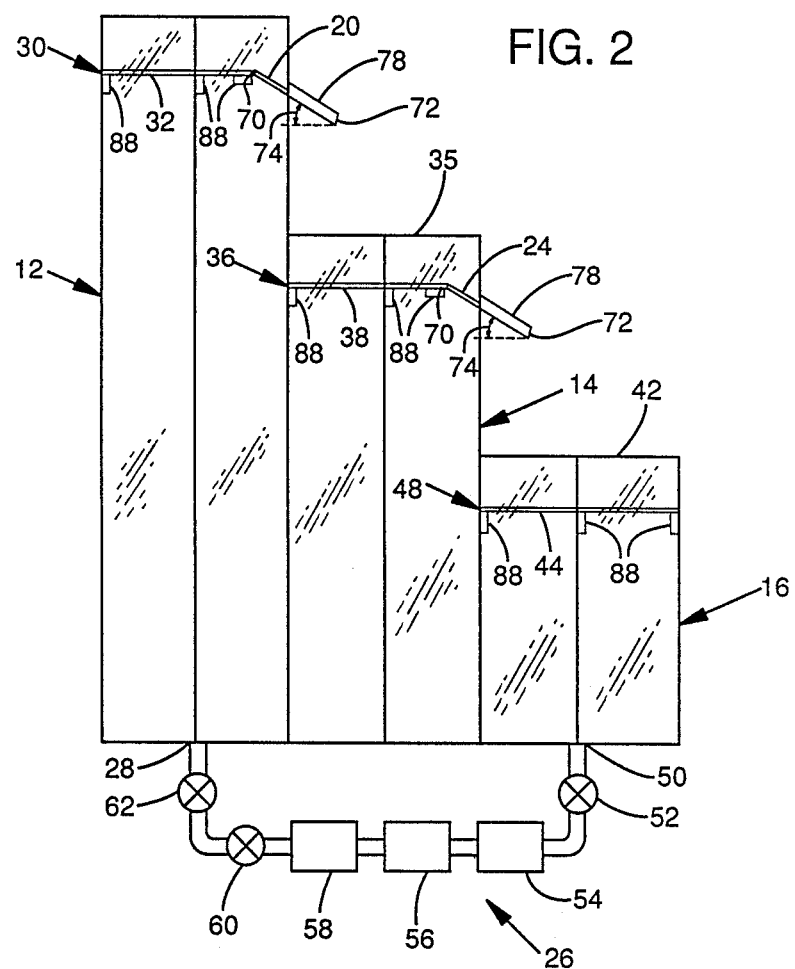

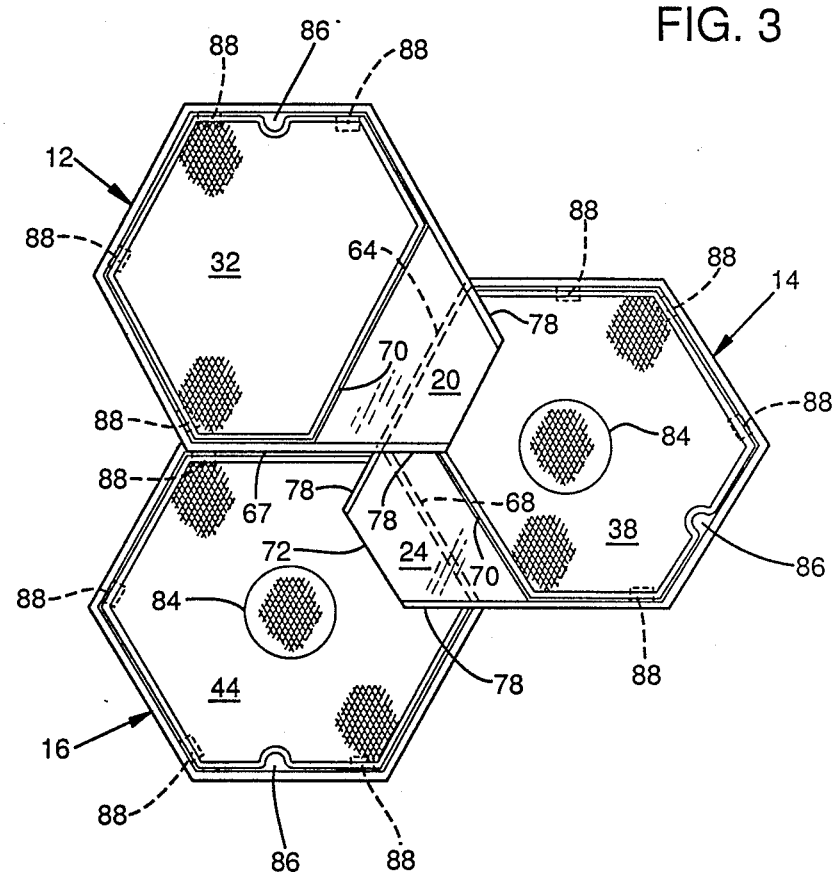

AQUARIUM AND WATERFALL SYSTEM

TECHNICAL FIELD

The present invention relates to aquarium systems for displaying marine life and, in particular, to such systems in which multiple aquarium tanks are employed.

BACKGROUND OF THE INVENTION

Fish tank arrangements in which water flows from upper tanks lower fish tanks are known. For example, U.S. Pat. No. 3,122,126 to Yamada describes fish farming equipment in which each of several fish tanks is positioned at a different height and water flows from higher fish tanks into adjacent lower fish tanks. In the Yamada equipment, a water sprinkling plate extends out from one side of each of the higher fish tanks. Each sprinkling plate is perforated with many small openings and projects over a portion of the adjacent lower fish tank. Filtered water flows from each of the higher fish tanks onto its associated water sprinkling plate. The water drops through the plurality of openings in the water sprinkling plate and drips into the lower fish tank.

The fish farming equipment disclosed by Yamada is specifically designed for the breeding of fish rather than the display of marine plants and animals. The sprinkling plates are configured solely to provide aeration of the water passing between adjacent fish tanks and consequently do not provide streams of falling water which are visually attractive and acoustically pleasing.

SUMMARY OF THE INVENTION

An object of the present invention is, therefore, to provide an aquarium system in which the display of marine life is enhanced with one or more displays of falling water.

The aquarium system of the present invention includes two or more aquarium tanks, each one of which is adapted to contain marine life in water up to a different predetermined upper water level. Except for the tank having the lowest upper water level, each aquarium tank includes a spillway. A continuous unconfined stream of water falls from each such spillway into the aquarium tank having the next lowest upper water level.

The tanks having spillways are equipped with retaining mechanisms for preventing the marine life from being washed out over the spillways. The tanks which receive streams of falling water are equipped with dispersing mechanisms for controlling the agitation caused by the falling water. In the preferred embodiment, these mechanisms comprise screens within the aquarium tanks located in proximity to their upper water levels. A transfer system provides constant circulation of the water by pumping water from the tank having the lowest upper water level to the tank having the highest upper water level and thereby furnishing a flow of water for the waterfalls.

Additional objects and advantages of the present invention will be apparent from the following detailed description of a preferred embodiment thereof which proceeds with reference to the accompanying drawings.

BRIEF DESCRIPTION OF THE DRAWINGS

FIG. 1 is a perspective view of one embodiment of the aquarium system of the present invention which includes three tanks and two waterfalls.

FIG. 2 is a diagrammatic side view corresponding to the aquarium system illustrated in FIG. 1.

FIG. 3 is a top plan view of the aquarium system illustrated in FIG. 1.

DETAILED DESCRIPTION OF PREFERRED EMBODIMENT

Referring now to FIG. 1 the aquarium system 10 includes a first aquarium tank 12, a second aquarium tank 14, and a third aquarium tank 16. The first aquarium tank 12 has a predetermined volumetric or aquatic capacity and a spillway 20. Water in excess of first tank capacity flows from the first aquarium tank 12, over the spillway 20, and into the second aquarium tank 14. The second aquarium tank 14 has a predetermined volumetric or aquatic capacity and a spillway 24. Water in excess of second tank 14 capacity flows from the second aquarium tank 14, over spillway 24, and into the third aquarium tank 16. A transfer system 26 (see FIG. 2) transfers water from the third aquarium tank 16 to the first aquarium tank 12 to provide continuous circulation of the water in the aquarium system 10. The water flowing over the spillways 20 and 24 forms waterfalls which enhance the visual appearance of the aquarium system 10 and which provide for oxygenation of the water for the tanks 12, 14 and 16.

Water enters the first aquarium tank 12 through an inlet 28 (see FIG. 2) positioned in the bottom of tank 12. When the water and the aquatic life in the tank 12 reach the tank capacity, the tank 12 is filled to the first predetermined upper water level 30 which corresponds to the position of spillway 20 and water consequently flows out over the spillway. A retaining means or screen 32 is mounted horizontally within the tank 12 and slightly below the upper water level 30. A plurality of small openings through the retaining screen 32 allow water to flow therethrough and over the spillway 20 while aquatic life, and especially piscatorial life, is retained within tank 12. Water flowing out from the spillway 20 of the first tank 12 falls as a continuous unconfined stream 34 into the second tank 14. A path for a flow of water from the first tank 12 to the second tank 14 in the form of a waterfall 34 is thereby provided.

The second aquarium tank 14 includes an upper rim 35 which is positioned below the spillway 20 of the first tank 12. When the water in the second tank 14 reaches the second tank 14 capacity, the tank 14 is filled to the second predetermined upper water level 36 which corresponds to the position of the spillway 24. A screen 38 is mounted horizontally within tank 14 and slightly below the water level 36. The screen 38 includes a plurality of small openings and is multi-purpose for providing a retaining function similar to that of retaining screen 32 and for dispersing the continuous unconfined stream 34 as it falls into the tank 14. The dispersion of stream 34 as it enters tank 14 is necessary to reduce the agitation and control the turbulence of the water in tank 14 that would otherwise be caused by stream 34 and which could detrimentally affect the marine life in the tank 14. As the continuous unconfined stream 34 falls from the tank 12 into the tank 14, the tank 14 is filled to the second upper water level 36 and consequently water flows out over the spillway 24. Water flowing out from the spillway 24 of the tank 14 falls as a second continuous unconfined stream 40 into the third tank 16. A path for a flow of water from the second tank 14 to the third tank 16 in the form of a waterfall 40 is thereby provided.

The third tank 16 includes an upper rim 42 which is positioned below the spillway 24 of the second tank 14. A dispersing means or screen 44 is mounted horizontally within the tank 16, at a fixed distance below the upper rim 42 at a third predetermined upper water level 48. The dispersing screen 44 disperses the second continuous unconfined stream 40 as it enters the tank 16 and reduces the turbulence and agitation of the water in the tank 16 which would otherwise be caused by the stream 40. The dispersing screen 44 is aligned with the steady state water level in tank 16.

Water levels are maintained in the tanks 12, 14, and 16 when the transfer system 26 is in operation. Water is drawn through an outlet 50 in the bottom of the third tank 16 and supplied to the inlet 28 in the bottom of the first tank 12 at the desired rate for water to flow and fall between the tanks. Water is thereby provided for a continuous flow from the first tank 12 to the second tank 14 and then to the third tank 16 by way of the two waterfalls 34 and 40 which furnish visual and auditory displays complimentary to the aquariums themselves. The system shown provides means for circulating water from the second to the first tank by reason of the presence of the third tank receiving water overflowing from the second tank through spillway 24, and the presence of transfer system 26 which removes water from the third tank and returns it to the first tank.

However, when the transfer system 26 is turned off water is no longer drawn through the outlet 50 and the water falling over the spillways 20 and 24 of the respective tanks 12 and 14 accumulates in the tank 16. The steady state water level in the tank 16 must therefore be positioned far enough below the rim 42 to accommodate the extra water that accumulates when the transfer system 26 is not in operation.

With reference to FIG. 2, the transfer system 26 includes a first shutoff valve 52 which may be closed to isolate the third tank 16 from the rest of the transfer system 26. The shutoff valve 52 is connected to a pump 54 which circulates the water from the third aquarium tank 16 toward the first aquarium tank 12. The pump 54 should have a pump speed substantial enough to circulate all the water held in the system 10 approximately once every five minutes such as, for example, a 350 gallon-per-hour pump for a 30 gallon system. High circulation rates help prevent the growth of algae within the aquarium tanks 12, 14, and 16. A heater 56 which is in communication with the pump 54 is provided to maintain the pumped water at a predetermined temperature suitable for the aquatic life resident in the tanks. A filter system 58 is coupled to the heater 56 and filters the heated water as it is directed toward first aquarium tank 12. A uni-directional check valve 60 is connected between the filter system 58 and tank 12 for preventing water from flowing back from the tank 12 toward the filter system 58. A second shutoff valve 62 is connected to the system 26 at the inlet 28 and may be closed to isolate the first aquarium tank 12 from the rest of transfer system 26.

FIG. 3 is a plan view of aquarium system 10. Each one of the aquarium tanks 12, 14, and 16 has a regular hexagonal cross-section and is constructed from lightweight glass panes cemented together with silicone adhesive although they may be constructed in accordance with any of a number of well-known techniques for building aquarium tanks. The tanks 12 and 16 share a sidewall 67. The tanks 12 and 14 share a sidewall 64 over which the spillway 20 is positioned. The tanks 14 and 16 share a sidewall 68 over which the spillway 24 is positioned.

Each one of the spillways 20 and 24 is shaped as a regular trapezoid having a spillway edge 70 and a parallel waterfall edge 72. The edges 70 of the spillways 20 and 24 extend approximately 2 inches into the respective tanks 12 and 14. The waterfall edges 72 of the spillways 20 and 24 extend approximately 1 inch from the sides of the respective tanks 12 and 14. The spillways 20 and 24 of the tanks 12 and 14 are oriented at an angle 74 (see FIG. 2) of approximately 26° relative to the horizontal (or 64° relative to vertical). Thus, they incline downwardly progressing from their top to bottom ends. Vertical side members 78 are positioned along the sides of the spillways 20 and 24. The side members 78 are oriented at approximately 30° to the direction of flow out of the spillways 20 and 24 and direct the water in the streams 34 and 40 so that the water converges as it falls. Each spillway, in summary, takes the form of a trough which has an imperforate flat bottom and sides bounding this bottom and which provides a path whereby water flows down the trough in a continuous flat stream of undispersed water with this stream cascading over the lower end of the trough. The vertical positions of the spillways 20 and 24 relative to the dispersing screens 38 and 44 are adjusted so that the streams 34 and 40 form confluences at the points of contact of the streams with the dispersing screens 38 and 44 of the tanks 14 and 16. The stream 34 reaches a confluence at the level of the screen 38 in the aquarium tank 14 at a predetermined location 80. The stream 40 reaches a confluence at the level of the screen 44 in the aquarium tank 16 at a predetermined location 82. For the construction illustrated for the system 10 and a water flow of approximately 350 gallons per hour a vertical distance of approximately 8 inches provides this effect and allows the waterfalls to strike the screens near to their narrowest points.

Each one of screens 32, 38, and 44 is constructed of an open mesh of nylon screen material having a mesh size of approximately 20 wires per linear inch. It will be appreciated, however, that any water compatible foramenous material having openings small enough to retain the aquatic life in the tanks and to help disperse the streams 34 and 40 would be suitable. The retaining screen 32 of the first aquarium tank 12 is positioned in close proximity to the edge 70 of the spillway 20. Similarly, the multi-purpose screen 38 of the second aquarium tank 14 is positioned in close proximity to the edge 70 of the spillway 24. The screen 44 is positioned below the rim 42 near to the upper water level 48 in the third tank 16. The screens 38 and 44 include reinforced portions 84 of limited area which comprise multiple layers of screen material attached to the surface of each of the screens 38 and 44. The reinforced portions 84 preferably include 4 layers of nylon screen stitched together by plastic line to form a thin circular pad about 3 inches in diameter. The reinforced portions 84 of the screens 38 and 44 are aligned with the respective locations 80 and 82 to help disperse the falling water from the streams 34 and 40. A feeding hole 86 through each one of the screens 32, 38, and 44 allows the operator to feed the aquatic life in the respective tanks 12, 14, and 16 without removing the screens. Support structures 88 (shown in phantom) are secured to the tanks 12, 14, and 16 and support the respective screens at their desired positions.

As may be obvious to those skilled in the art that many changes may be made in the above-described details of the preferred embodiment of the present invention without departing from the underlying principles of the invention. For example, the aquarium system could include any number of tanks greater than one or tanks having different cross-sectional shapes or tanks which do not have common sidewalls. Additionally, the tanks could include lights positioned along their bottom levels for providing illumination of the marine life and for providing reflective and refractive visual effects. The scope of the present invention should therefore only be determined in accordance with the following claims.

I claim:

1. An aquarium system, comprising:
    a first tank constructed and arranged to provide an aquatic environment suitable for marine life, a trough having an imperforate and essentially flat bottom and sides bounding the bottom and which has an upper end joining with the interior of the tank and inclines downwardly from said upper end to a lower end spaced outwardly from the side of the tank, said trough providing a spillway over which water leaves the upper end of the tank with such water flowing as a continuous flat stream of undispersed water which cascades over the lower end of the trough;
    retaining means mounted in proximity to the upper end of said trough and constructed to strain all water flowing out of said first tank through said trough for retaining aquatic life within the first tank as water flows out over the trough;
    a second tank constructed and arranged to provide an aquatic environment suitable for marine life, the second tank having an upper end positioned lower than the lower end of the trough and being positioned for receiving the stream of water cascading over the lower end of the trough;
    dispersing means for dispersing the stream of water received into the second tank, the dispersing means comprising a screen mounted within the second tank in a position spaced horizontally below the lower end of the trough in proximity to the upper level of the water in the second tank and substantially covering the second tank; and
    means for circulating water from the second tank to the first tank.

2. The system of claim 1, wherein:
    the retaining means comprises a substantially horizontal screen extending across the first tank and said circulating means includes an inlet introducing water to the first tank connecting with the first tank adjacent its bottom.

3. The aquarium system of claim 1, wherein the dispersing screen further includes a reinforced portion having a plurality of layers of screen located at the position where the stream of water cascading from the lower end of the trough contacts the dispersing screen.

4. The aquarium system of claim 1, wherein said means for circulating water comprises another trough having an imperforate and essentially flat bottom and sides bounding the bottom and which has an upper end joining with the interior of the second tank and which inclines downwardly from said upper end to a lower end spaced outwardly from the side of the second tank, said trough providing a spillway over which water leaves the upper end of the second tank with such water flowing as a continuous flat stream of undispersed water which cascades over the lower end of the said other trough; and
    a third tank constructed and arranged to provide an aquatic environment suitable for marine life, the third tank having an upper end positioned below the lower end of said other trough and positioned to receive the stream of water cascading over the lower end of said other trough.

* * * * *